US011285961B2

(12) United States Patent
Weldemariam et al.

(10) Patent No.: US 11,285,961 B2
(45) Date of Patent: Mar. 29, 2022

(54) PREDICTIVE CAR WASH SERVICES FOR A VEHICLE BASED ON ANTICIPATED ROUTES OF TRAVEL

(71) Applicant: International Business Machines Corporation, Armonk, NY (US)

(72) Inventors: Komminist Weldemariam, Ottawa (CA); Oliver Bent, Oxford (GB); Michael S. Gordon, Yorktown Heights, NY (US); James R. Kozloski, New Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 16/565,933

(22) Filed: Sep. 10, 2019

(65) Prior Publication Data

US 2021/0070304 A1    Mar. 11, 2021

(51) Int. Cl.
| | |
|---|---|
| B60W 40/06 | (2012.01) |
| G01C 21/36 | (2006.01) |
| G06N 20/00 | (2019.01) |
| G07C 5/08 | (2006.01) |
| G07C 5/00 | (2006.01) |
| G06N 20/20 | (2019.01) |
| G06Q 30/02 | (2012.01) |

(52) U.S. Cl.
CPC ......... *B60W 40/06* (2013.01); *G01C 21/3679* (2013.01); *G06N 20/20* (2019.01); *G06Q 30/0282* (2013.01); *G07C 5/008* (2013.01); *G07C 5/0808* (2013.01)

(58) Field of Classification Search
None
See application file for complete search history.

(56) References Cited

U.S. PATENT DOCUMENTS

| | | |
|---|---|---|
| 3,815,512 A | 6/1974 | Balas |
| 7,201,315 B2 | 4/2007 | Symonds et al. |
| 9,355,319 B2 | 5/2016 | Jang et al. |
| 9,421,979 B2 | 8/2016 | Szwabowski et al. |
| 9,499,172 B2 | 11/2016 | Urmson et al. |

(Continued)

FOREIGN PATENT DOCUMENTS

CN        106961520 A      7/2017

OTHER PUBLICATIONS

Mitchell, "Spiffy: The Mobile Car Wash Company Cleaning Up the On-Demand Economy", https://www.forbes.com/sites/julianmitchell/2017/03/22/spiffy-the-mobile-car-wash-company-reshaping-the-on-demand-economy/#7df7c768cfe8, Mar. 22, 2017, 6 pages.

(Continued)

*Primary Examiner* — Abdhesh K Jha
(74) *Attorney, Agent, or Firm* — Scully, Scott, Murphy & Presser, PC; Shimon Benjamin, Esq.

(57) ABSTRACT

A method and system for predicting vehicle wash services for a human-driven or self-driven vehicle. The method determines anticipated routes of travel for the vehicle based on context of a user associated with the vehicle, implements machine learning neural network models for predicting the road conditions in the anticipated routes of travel, and, then, auto-suggests one or more candidate car wash locations and associated Time of Days (to wash the car) while optimizing a user value.

20 Claims, 8 Drawing Sheets

(56) References Cited

U.S. PATENT DOCUMENTS

| | | |
|---|---|---|
| 2004/0100217 A1* | 5/2004 | Neubauer ............ B60S 1/0818 |
| | | 318/480 |
| 2014/0330623 A1 | 11/2014 | Detrick |
| 2015/0348335 A1* | 12/2015 | Ramanujam ......... G05D 1/0088 |
| | | 701/23 |
| 2016/0042576 A1 | 2/2016 | Fischer et al. |
| 2016/0133066 A1 | 5/2016 | Lavie |
| 2017/0109944 A1 | 4/2017 | Barajas Gonzalez et al. |
| 2020/0126259 A1* | 4/2020 | Accessor .................. G06T 7/90 |
| 2021/0148878 A1* | 5/2021 | Kannan .................. G06Q 10/20 |

OTHER PUBLICATIONS

Cito, "Best Mobile Car Wash App for Quick Car Cleaning Service", https://citocarwash.com, Accessed on May 30, 2019, 3 pages.

Perez, "Washé raises $3.5 million for its on-demand car washing service and biz platform", https://techcrunch.com/2018/05/03/washe-raises-3-5-million-for-its-on-demand-car-washing-service-and-biz-platform/, Accessed on May 30, 2019, 7 pages.

* cited by examiner

PREDICTIVE CAR WASH SERVICES FOR A VEHICLE BASED ON ANTICIPATED ROUTES OF TRAVEL

FIELD OF THE INVENTION

The present disclosure is directed to provisioning of a service for washing vehicles, and more specifically, to computer-implemented methods and systems for automatically predicting and scheduling vehicle wash services for a vehicle (e.g., human or self-driven vehicle) based on the determined anticipated routes of travel for the vehicle, weather, and predicted road conditions in the anticipated routes of travel.

BACKGROUND

Vehicle car wash services are provided in order to keep the vehicles functional and clean for all personal or professional activities.

It is the case that a user may take a car to a car wash and pay for the washing and oil change service. However, after an hour of use, the car or vehicle becomes super dirty again due to an unexpected rain coupled with the fact the destination driven to by the user with the washed car had ongoing construction along the route—thus rendering the car full of dust and dirt.

This scenario happens to many people every day. Thus, typically, when a user decides to take his/her personal vehicle to be washed, they may consider checking weather before taking to the washing service (if the user is so inclined to check). While a user sometimes considers that (by manually checking weather typically), there are various contextual factors the user usually does not attentively consider, for example, driving to/through areas which are dirty or muddy or predicted to be dirty/muddy.

SUMMARY OF THE INVENTION

An embodiment of the present invention is a system and method that intelligently analyzes various factors associated with car washing, and preemptively suggests to a user, via a mobile phone device or vehicle display interface, the best location and time of day for a car wash service.

In a first aspect, there is provided computer-implemented method for automatically scheduling a wash service for a vehicle. The method comprises: receiving, at a processor, data pertaining to a context associated with use of a vehicle; determining, by the processor, based on the user context, anticipated routes of travel for the vehicle to arrive at destination locations associated with the context; computing, by the processor, for each of the anticipated routes of travel, based on received first data, a measure of a road dirtiness condition impacting an exterior cleanliness condition of the vehicle; computing, at the processor, based on received second data, a measure of a current external dirtiness condition of the vehicle; determining, by the processor, based on the road dirtiness condition measure of each the anticipated routes and the current exterior cleanliness condition of the vehicle, one or more candidate vehicle washing locations configured to externally clean the user vehicle and available times of day in a future time period with which the vehicle can be externally cleaned at a vehicle washing location; and automatically scheduling, using the processor, a candidate car wash location of the one or more candidate car wash locations and an associated time optimally determined to clean the external vehicle in anticipation of traveling along the one or more of the anticipated routes of travel to one or more destination locations.

In a further aspect, there is provided a system for automatically scheduling a wash service for a vehicle. The system comprises: a memory device configured to store data; a hardware processor configured to be in communication with the memory device, the hardware processor being configured to: receive from the memory device, data pertaining to a context associated with use of a vehicle; determine, based on the user context, anticipated routes of travel for the vehicle to arrive at destination locations associated with the context; compute, for each of the anticipated routes of travel, based on received first data, a measure of a road dirtiness condition impacting an exterior cleanliness condition of the vehicle; compute, based on received second data, a measure of a current external dirtiness condition of the vehicle; determine, based on the road dirtiness condition measure of each the anticipated routes and the current exterior cleanliness condition of the vehicle, one or more candidate vehicle washing locations configured to externally clean the user vehicle and available times of day in a future time period with which the vehicle can be externally cleaned at a vehicle washing location; and automatically schedule a candidate car wash location of the one or more candidate car wash locations and an associated time optimally determined to clean the external vehicle in anticipation of traveling along the one or more of the anticipated routes of travel to one or more destination locations.

In an aspect of the present disclosure, there is provided a computer program product comprising a non-transitory computer readable storage medium having program instructions embodied therewith, the program instructions executable by a processing element of a device to cause the device to: receive from a memory device, data pertaining to a context associated with use of a vehicle; determine, based on the user context, anticipated routes of travel for the vehicle to arrive at destination locations associated with the context; compute, for each of the anticipated routes of travel, based on received first data, a measure of a road dirtiness condition impacting an exterior cleanliness condition of the vehicle; compute, based on received second data, a measure of a current external dirtiness condition of the vehicle; determine, based on the road dirtiness condition measure of each the anticipated routes and the current exterior cleanliness condition of the vehicle, one or more candidate vehicle washing locations configured to externally clean the user vehicle and available times of day in a future time period with which the vehicle can be externally cleaned at a vehicle washing location; and automatically schedule a candidate car wash location of the one or more candidate car wash locations and an associated time optimally determined to clean the external vehicle in anticipation of traveling along the one or more of the anticipated routes of travel to one or more destination locations.

Further features as well as the structure and operation of various embodiments are described in detail below with reference to the accompanying drawings. In the drawings, like reference numbers indicate identical or functionally similar elements.

DETAILED DESCRIPTION

The present disclosure provides a system, method and computer program product for predicting for a user (e.g., a driver of a vehicle) or a self-driving vehicle (SDV) an optimal time and place to wash the vehicle based on various factors.

As will be referred to herein, "cleanliness" or "dirtiness" of a vehicle refers to the overall integrity of the exterior finish of a vehicle, either due to surface contaminants, or due to direct compromise of the finish by corrosive of otherwise damaging agents.

Figure 1:
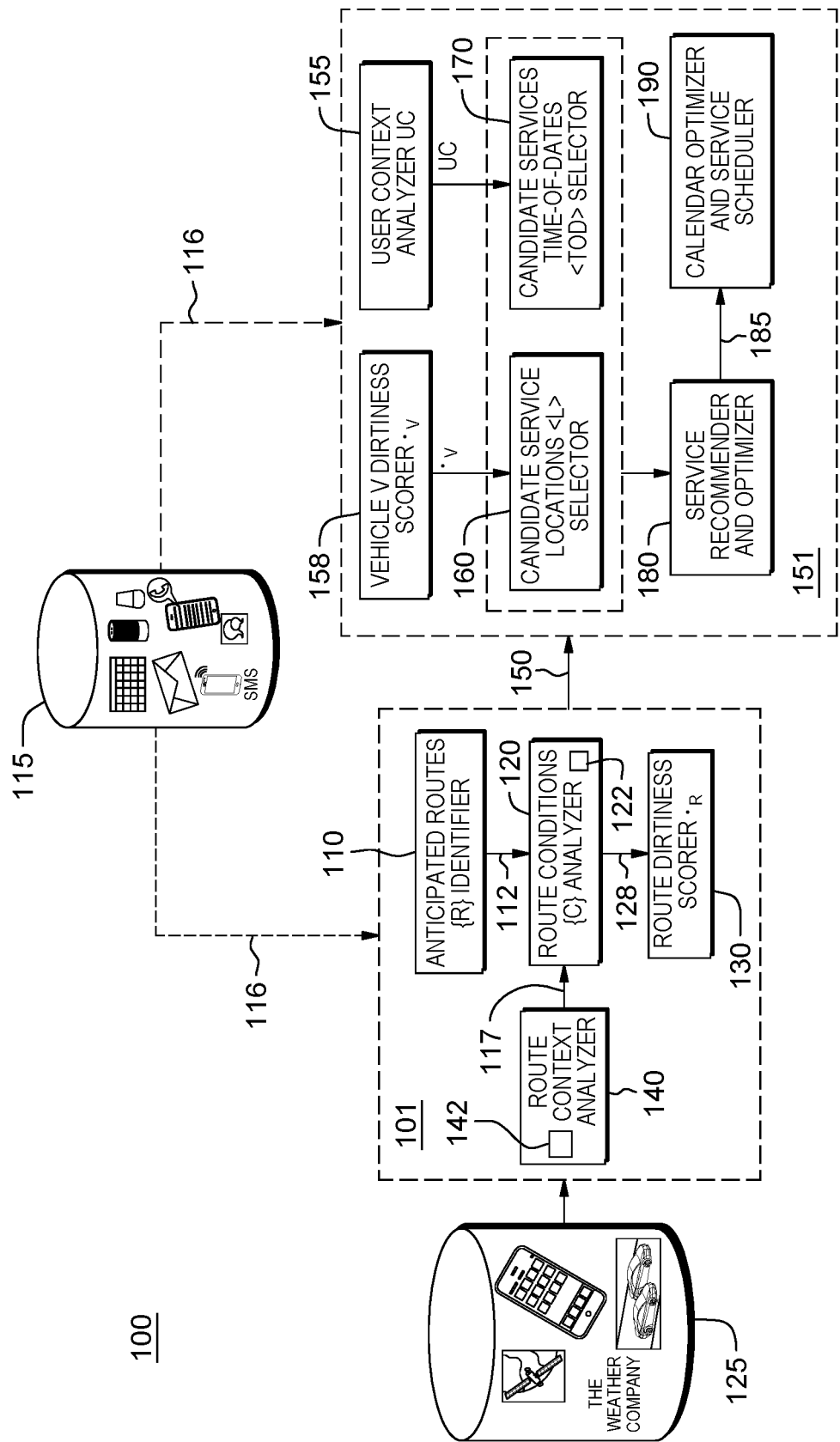
FIG. 1 illustrates a system for predictive car wash services for a vehicle based on anticipated routes of travel.

FIG. 1 presents an automated predictive vehicle wash service and auto-scheduling system 100 embodied as a computer system including one or more processors implementing methods to suggest and auto-schedule a vehicle wash service for a vehicle (a human driven or SDV). The methods implemented include: determining anticipated routes of travel for the vehicle based on historical data, pre-scheduled routine activities or events (e.g., picking a child from school, shopping, etc.); using trained models for predicting the road conditions in the anticipated routes of travel; and determining a scheduling of the best location L and time-of-day ToD(s) for the vehicle wash service while optimizing value.

The services may be configured as a mobile application ("app") for use on a user's mobile device, or in addition, as a user application. A server system running a service provider application accesses a backend system running AI/machine learning models (used for both the applications and backend systems).

For a vehicle, the predictive vehicle wash service and auto-scheduling system 100 runs natural language processing and analytics methods for determining anticipated routes of travel for the vehicle, predicting the road conditions in the anticipated routes of travel, and, in response, automatically suggesting one or more candidate car wash locations and associated Time of Days (to wash the car) while optimizing value for the user.

The predictive vehicle wash service and auto-scheduling system 100 monitors a vehicle status and generates a message, e.g., a text message or mobile phone alert, and communicates the message to a user via a user device, e.g., mobile phone or computer, to notify the user about a candidate car wash location and Time of Day. The notification presented to the user on a user's mobile device is displayed via an application interface, short messaging service (SMS), or calendar notification, or notify the user on the dashboard or similar interface of that user's vehicle/car.

The predictive vehicle wash service and auto-scheduling system 100 for predicting car wash services for a vehicle based on anticipated routes of travel as shown in FIG. 1 includes the following processing modules: a route analyzer module 101 implementing an anticipated routes {R} identifier module 110, a route conditions {C} analyzer 120 and a route dirtiness scorer module 130. A route context analyzer module 140 receives user and route context data from a variety of sources. In an embodiment, user and route context data may be received for use in predicting car wash services in real-time or near real-time. The data can include current and forecast environmental, weather and traffic condition data 125 for a particular area. User context sources 115 can include sources such as that vehicle user's calendar application, digital notebooks, e-mails, or social media posts. Based on this context data, route analyzer module 101 determines anticipated routes of travel for a vehicle in a current time or future time period, e.g., days, and determines associated route dirtiness values for each anticipated route and/or a score aggregated for all routes.

In an embodiment, system 100 for predictive car wash services further includes a predictive car wash services module 151 for automatically running methods for determining a location and time for optimally receiving a vehicle car wash service that brings the most value to the user. Module 151 receives route dirtiness score(s) 150 for various potential route(s) a vehicle is predicted to traverse as determined by route analyzer module 101 in near real-time or future time period, obtains a current vehicle dirtiness measure or score, and invokes processing modules for auto-suggesting one or more candidate car wash locations and associated Time of Days (to wash the car) while optimizing value.

As referred to herein, a "route dirtiness score" refers to the dirtiness score of a route or a measure of how the route is anticipated to impact and render dirty a vehicle exterior traversing the route, e.g., in a scale of 0 to 10 where 0 is "very clean" and "10" is very dirty, or vice versa.

Predictive car wash services module 151 runs processing modules including: a user context (UC) analyzer module 155 for analyzing/generating a user context requiring use of the vehicle (human operated or SDV) at a particular high cleanliness level (i.e., clean), a vehicle {V} dirtiness scorer module 158 for evaluating a "vehicle dirtiness score" for the subject vehicle, a candidate service locations {L}selector module 160 and a candidate service time-of-days{ToD}selector module 170; a service recommender and optimizer module 180; and a calendar optimizer and service scheduler module 190.

As referred to herein, the "vehicle dirtiness score" is a measure of the dirtiness of the vehicle (or how clean a vehicle is externally and/or internally or both), e.g., according to a scale of 0 to 10. In an embodiment, a benchmark can be used to indicate an acceptable "standard" for cleanness of a vehicle, and over time, a standard of external vehicle cleanliness can be created.

Using the route dirtiness score $S_R$ and vehicle dirtiness score values $S_V$, the predictive car wash services module 151 runs methods for suggesting from the set of user data 116 that the vehicle V be optimally scheduled for a wash service at a designated car wash location L and Time-of-Day ToD.

Figure 2:
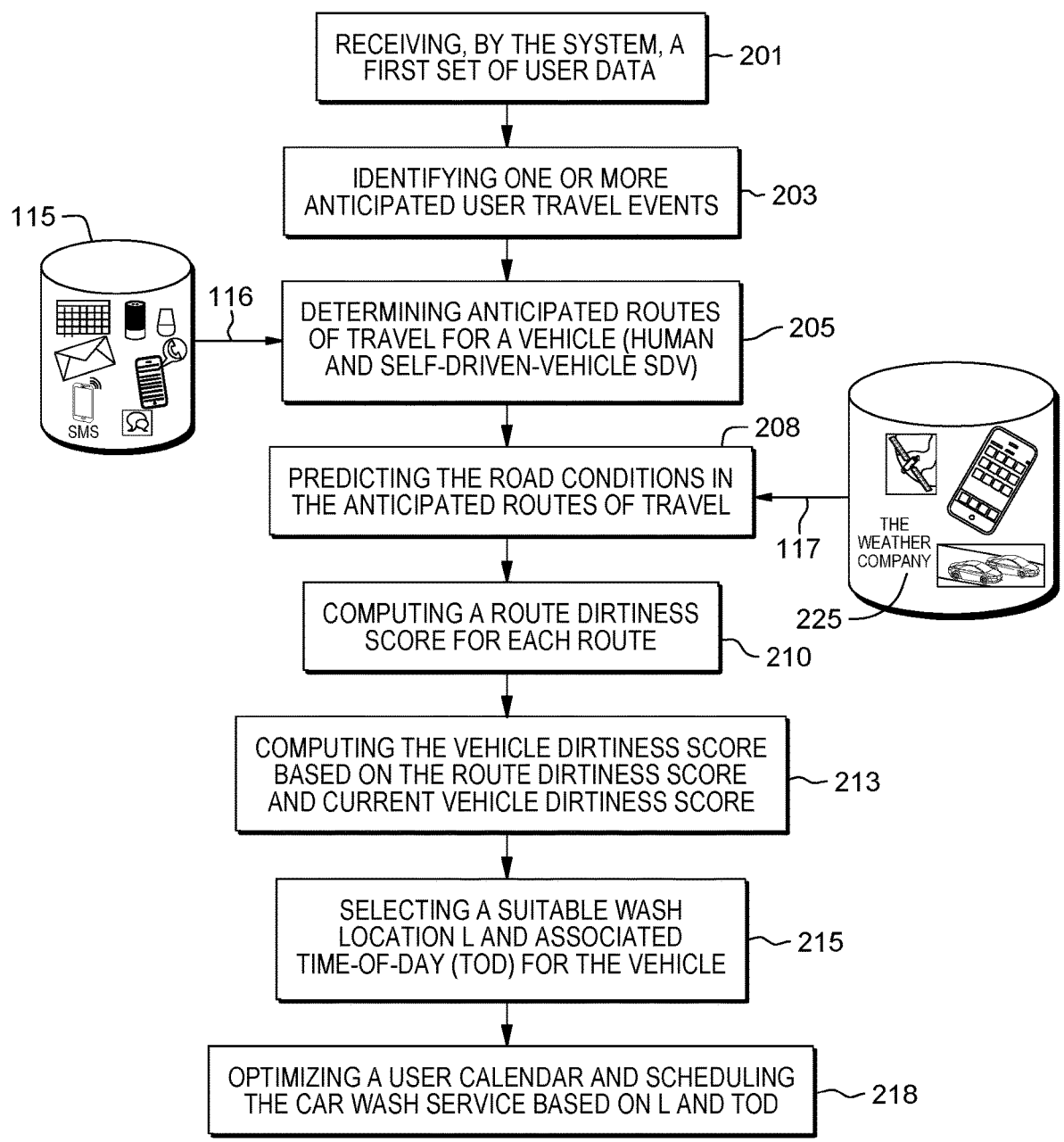
FIG. 2 depicts a flowchart illustrating the steps to implement automated predictive car wash services for a vehicle according to an embodiment.

FIG. 2 depicts a general flowchart illustrating a method 200 run by the modules of a computer system 100 for automated prediction of car wash services.

At a first step 201, predictive car wash services module 151 receives a first set of user data 116 from a variety of sources 115 which may include: data from a user's electronic calendars, digital notebooks containing historic user activities or events, pre-scheduled activities or events, voice or text conversation data such as call logs, data from email, data from social media user posts, data from messaging applications ("apps") such as Short Message Service (SMS), WhatsApp™ messaging service (Service Mark of WhatsApp Inc.), etc., and additionally data from artificial intelligence (AI) assisted devices such as Alexa®, Apple Siri® Trademarks of Apple Corporation, Google Home®), etc.

Based on the set of user data 116, the predictive car wash services module 151 employs, at 203, user context (UC) analyzer module 155 to run methods for identifying one or more anticipated user travel events. As a non-limiting example, UC analyzer module 155 running in computer system 100 runs natural language processing methods for processing data 116 and identifying one or more anticipated user travel events (e.g., picking a child from a school, dropping the child to weekly/regular swimming session after school, driving to a weekly appointment, picking some items from a grocery store, etc.) that require the use of a user vehicle V based on the received first set of user data 116.

As an example, UC analyzer module 155 runs natural language processing methods on the received user data to determine an "unavoidable vehicle usage context (UVUC)" for a user, which is a prediction the user will be using the vehicle to drive to an important function, event or a special occasion at a certain time in the future, e.g., "T" hours. In an embodiment, in determining a UVUC (context), the vehicle is understood as needing to present a minimum cleanliness level when used for such functions. In an embodiment, these minimum cleanliness levels are preconfigured by a user, a fleet owner, or a community. In addition, they can be learned based on user feedback (e.g., by a preconfigured interface for rating the qualities of a vehicle or ride service) such that the minimum level of desired cleanliness is always maintained. In one embodiment, users pre-label certain activities or events based on their importance level in determining unavoidable vehicle usage. Additionally, the system can prompt a user device to confirm a certain activity or event is a UVUC via a mobile device user interface.

Continuing in the method of FIG. 2, in a next step 205, the system 100 runs methods determining anticipated routes of travel for the vehicle V (e.g., human or self-driving vehicle). Route anticipation occurs, for example, by means of stored preselected and/or searched routes by a driver, by means of analysis of a passenger's calendar of events and meetings, or by means of analysis of past travel patterns on days of the week. In one embodiment, the route of travel may include round trips between a hotel or convention center and a local airport. In particular, the Anticipated Routes R Identifier module 110 receives the first set of user data 116 and/or locations corresponding to the UVUC travel event(s) identified by the context analyzer 155 at step 203 and runs methods for identifying anticipated routes of travel 112 for the vehicle V.

Figure 3B:
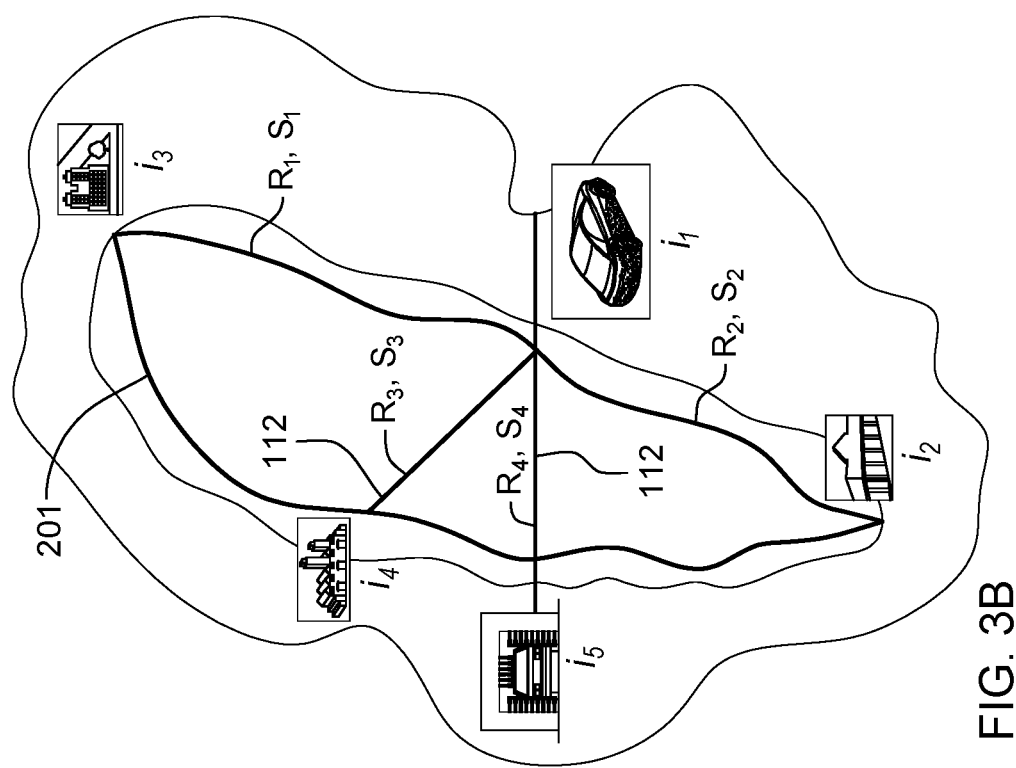
FIG. 3B illustrates a schematic representation of the map according to FIG. 3A, however depicting the respective routes with calculated route dirtiness level scores in accordance with an embodiment.
Figure 3A:
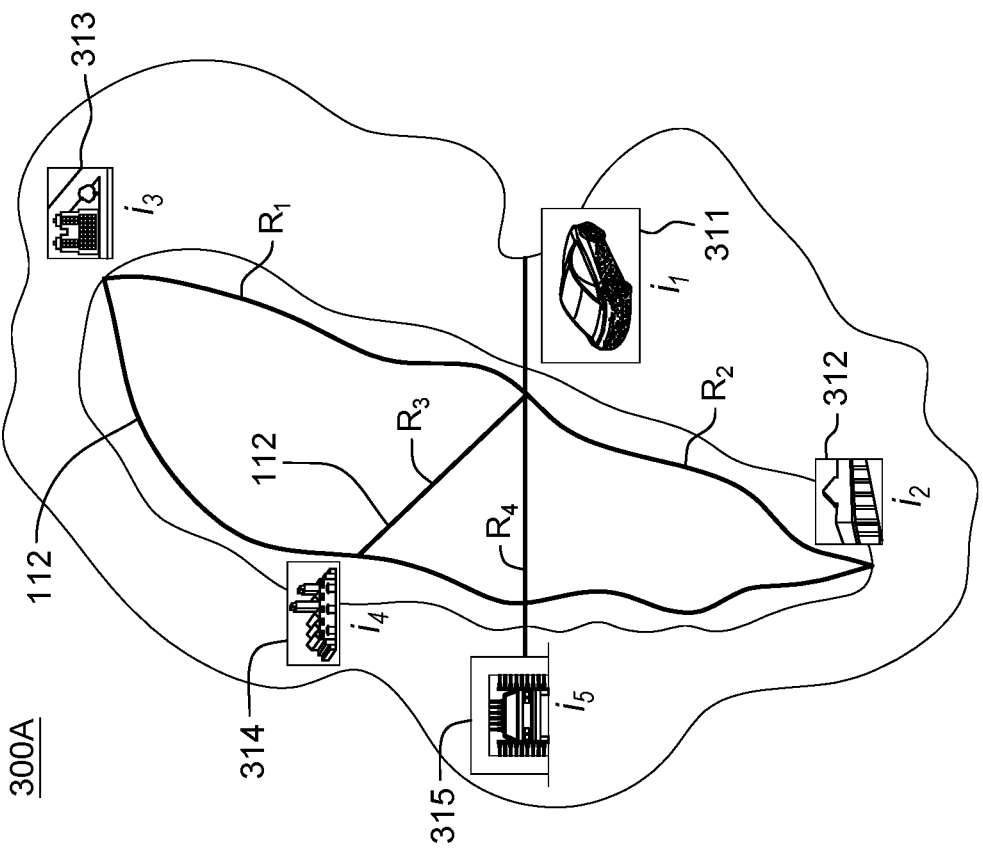
FIG. 3A is a schematic representation of a map including routes and locations of places in accordance with one embodiment.

FIG. 3A is a schematic representation of a map 300A including routes and locations of places associated with determined events in accordance with one embodiment of the system 100. In the map 300A, the Anticipated Routes Identifier module 110 has identified anticipated routes of travel 112 (e.g., routes $R_1$, $R_2$, $R_3$, $R_4$) for the vehicle V in a future time period using the first set of user data 116. In an embodiment, the anticipated directions of travel for the user 112 is related to pre-scheduled activities or the determined anticipated user travel events, e.g., events $i_1$, $i_2$, $i_3$, $i_4$, $i_5$ shown at respective locations 311-315 at map 300A, that the user regularly carries out. The system can alternatively run a prediction model to predict anticipated routes of travel for the user based on historical events/activities and real-time data feeds (e.g., social media posts). Non-limiting examples of pre-scheduled activities or events include: a user will pick his/her offspring from a school (e.g., location 313 of event $i_3$ as in FIG. 3A); a user will drop his/her son to weekly/regular swimming session after school (e.g., at location $i_4$); the user will pick some items from a local department store (e.g., at location 312 of event $i_2$ as in FIG. 3A).

Returning to FIG. 2, at 208, the system 100 then performs predicting the road conditions that impact cleanliness of the vehicle for each of the anticipated routes of travel represented as a set of roads/routes, e.g., routes R= $\{R_1, R_2, \ldots, R_n\}$ 112 shown in FIG. 3A. In particular, the route analyzer module 101 of FIG. 1 receives road context data such as video and image data from a plurality of data sources and using trained deep learning models invokes data and image analysis techniques to determine or predict one or more route conditions (e.g., estimated dust, mud, sand, snow, hail, slush or salt including amount/volume/intensity/depth, etc.) for the roads traversed along each of the identified anticipated routes 112.

In an embodiment, as shown in FIG. 1, conditions analyzer module 120 trains and implements a Sliding Window with Multi-Step Forecasting method with a convocation/recurrent neural network model(s) 122 in which algorithms are run to make a multi-step time series forecast of road conditions. In an embodiment, recursion is implemented which involves making a prediction for one time step, taking the prediction, and feeding it back into the model as an input for predicting a subsequent time step. For example, a model may use a Multi-Step Forecasting method based on recognition of weather events fed into the system at some moment, and then updated periodically by feeding similar weather events data into the system. Because road conditions change not only depending on a present weather event (e.g., it is raining) but also based on how the present weather event contributes to a history of events (it is raining, and has been since yesterday afternoon) the Multi-Step Forecaster maintains the context of past weather events in its prediction and categorization of present road conditions and their effects on car cleanliness. In an embodiment, a system memory associated with system 100 may store a set of "deep learning" neural network model instructions, where the model evaluation instructions include instructions, such as executable code, related to logic operations, graphics processing, machine learning algorithms, and/or other algorithms or techniques to learn and accurately predict road conditions as implemented in the system 100. A processor running on a local computer system, a server such as a web-based back-end server or cloud environment is configured to execute one or more portions of the instructions in order to facilitate implementation of the system 100.

In an embodiment, at a back-end server or at the cloud level, data summarization, aggregation and inference techniques using specifically trained deep convolution neural network (CNN) models, are run to determine the one or more road conditions for the period of time of the vehicle's anticipated usage and to generate a route dirtiness score.

Returning to FIG. 2, at 210, the analyzer block 101 then generates a route dirtiness score for each of the routes 112 based on the predicted route conditions. In the computing of a route dirtiness level score for each route, the method invokes road context analyzer 140 for receiving road context data 125 including, but not limited to: weather data from satellite images or local sensors for the area to be traveled, data indicating weather forecast for the area to be traveled, feeds of crowdsourced data from social media posts regarding road conditions. The road context data further includes data from other vehicles that are connected and in communication with the system 100 ("connected vehicles"), i.e., a vehicle that is equipped with Internet access, and additionally with wireless local area network (LAN) access allowing the car to share sensed data with other devices both inside and outside the vehicle. In an embodiment, vehicles are connected using dedicated short-range communications radios. Thus, the context regarding road conditions outside the vehicle can be obtained from sensors at other connected vehicles along the target vehicle's anticipated paths.

In an embodiment, the route context analyzer module 140 invokes methods for identifying the relevant contextual data for a given route from a plurality of data sources (e.g., current weather feed, traffic feeds, remote sensing from connected vehicles, etc.). As an example, via an application programming interface 142 run at the module 140, e.g., a weather API integrating and receiving weather data for an area specified by a geolocation for a particular future time period into a cloud application. In an embodiment, the Route Context Analyzer module 140 performs methods for predicting a probability of occurrence of precipitation, e.g., rain, within a certain radius of the user location, e.g., determining that there will be 97% chance of flash rain (within a 25 mile radius).

Route context analyzer 140 filters the received data 125 to obtain relevant road context data 117 for the indicated user routes, and provides the road context data 117 to Route Conditions Analyzer 120 for further processing. The identified contextual data 117 is input to route conditions analyzer module 120 that invokes data and image analysis methods for determining one or more conditions (e.g., estimated dust volume/intensity/amount, mud, snow, hail, slush, etc.) for each identified anticipated route based on the data 117.

In an embodiment, contextual data collected at module 120 from other "connected" vehicles include road/route data as collected by vehicle-based sensors, cameras, video recorders at the other vehicles that have traversed or are traversing along the anticipated route(s). Examples of sensors and sensing devices of connected vehicles can include automatic windscreen wipers, lights and traction control sensor data, etc. Using data collected by connected vehicles while the connected vehicles traverse the road/route enables collection of information about specific parts of the road/route segment data which may not otherwise be able to be collected by commercial data feeds.

In predicting road conditions, in an embodiment, Route Conditions Analyzer module 120 performs, for each road/route $R_i \subseteq R$, methods for analyzing and determining one or more road conditions that can make a vehicle dirty. For example, an analysis of current road conditions can determine amounts of dust, mud, snow, hail, slush, including volume/intensity/amounts/depth, etc. Such an analysis may include ascertaining the presence and amount of potholes filled with dirt/water/snow, etc. that can render dirty a vehicle that passes through them.

The Route Conditions Analyzer module 140 then invokes Route Dirtiness Scorer module 130 implementing methods for analyzing the current conditions and context and implementing methods for calculating a corresponding route dirtiness score $S_{R_i}$ based on analysis of the determined one or more route conditions 128 (e.g., estimated dust, mud, snow, hail, slush, salt, sand volume/intensity/amount) where i identfies a route of a set of anticipated routes R. In its simplest form, the score is a linear sum of weighted contributors to route conditions and their effects on a vehicle. In another form, more weight could be placed on route conditions that cause a car to be dirtier, faster. For instance, road salt or pollen dirties a car faster than rain.

In particular, the module 130 invokes methods for training and using the deep learning convocation/recurrent neural network models to predict route dirtiness values based on trained data. For example, a Sliding Window With Multi-Step Forecasting with convocation/recurrent neural network model is trained with historical road contextual data (e.g., weather conditions, resulting types and amounts of dirt, mud, snow, hail, slush, salt, sand, dust and other road conditions, traffic conditions, pollution conditions, etc.) to determine road conditions to generate a corresponding dirtiness score value. Using the trained models, the system outputs a current route conditions and a route conditions score 150 representing the route conditions of all the anticipated routes for a user's vehicle, e.g., individually or in the aggregate. In an embodiment, inputs to the deep learning model can include municipal road work reports, recent weather history, traffic conditions, smog conditions, average speed of vehicles observed, outputs from vehicle sensors such as rain sensing windshield monitors, time of day, and temperature. Outputs may include a projected dirtiness profile representing the likely score of noticeable dirtiness on the vehicle by the driver. This score value may increase and then decrease if a dusty road is followed by a fast well-paved road. The system learns these fluctuations over time and predicts them. In another example the value may be low then rise if the car travels on a snow covered roadway followed by a roadway that has been plowed and sanded.

FIG. 2B illustrates a schematic representation of a map 300B corresponding to the map 300A of FIG. 3A shown including the routes $R_1$, $R_2$, $R_3$, $R_4$ and corresponding destination locations of events $i_1$, $i_2$, $i_3$, $i_4$ and further including the calculated dirty level score $S_{R_i}$ for each respective route $R_i$ in accordance with an embodiment. Example dirtiness scores $S_1$, $S_2$, $S_3$, $S_4$ generated by the model run at the scorer module 130 for each of routes $R_1$, $R_2$, $R_3$, $R_4$ can range between a value of 0 to 10, where value of 10 represents an unavoidable and significant impact to the external cleanliness of the car, e.g., being the highest dirt score, and a lowest score number representing no predicted impact. Scores in between 0 and 10 represent various degrees of predicted dirtiness impact to the external cleanliness of the car.

Thus, in a further embodiment, at step 210, FIG. 2, the route dirtiness scorer module 130 can aggregate the dirtiness scores across all the anticipated routes of travel, e.g., the routes $R_1$, $R_2$, $R_3$, $R_4$ of FIG. 3B, for that particular vehicle and generate a set $S_R$ of scores S for all the anticipated routes R.

After computing the route dirtiness score $S_{R_i}$ for each route along the anticipated routes of travel, then at 213, the system performs methods for computing the vehicle dirtiness score $S_{V_i}$ for the user's vehicle $V_i$ based on the route dirtiness score and a current vehicle dirtiness score for a vehicle Vi.

In an embodiment, as shown in FIG. 1, route dirtiness score values $S_R$ 150 are communicated to the predictive car wash services module 151. The route dirtiness scores $S_R$ are one of the inputs/features to the module (Vehicle Dirtiness Scorer module) running methods to compute a dirtiness score $S_V$.

In particular, the Vehicle Dirtiness Scorer module 158 of the predictive car wash services system 151 of FIG. 1 runs machine learning based techniques for calculating an aggregated dirtiness score $S_V$ for the vehicle V, if it travels through all the anticipated directions (i.e., R) or through some of the anticipated directions R'⊆R'.

In an embodiment, Vehicle Dirtiness Scorer module 158 implements a data-driven approach to determine a cleanness of the vehicle and generate a vehicle dirtiness score.

The module 158 runs a deep neural network machine learning model(s) trained with data such as both high and low quality sensor-based images and/or video camera/feeds from camera/sensors as input data to determine a current level of external or internal cleanness of the vehicle which is used to generate a vehicle wash alert or schedule a wash event for the vehicle. In an embodiment, a trained deep neural network machine learning model includes a convolutional neural network (CNN) type of neural network that implements perceptrons, a machine learning method, for supervised learning, to analyze the input data for image and video analytics.

Figure 4:
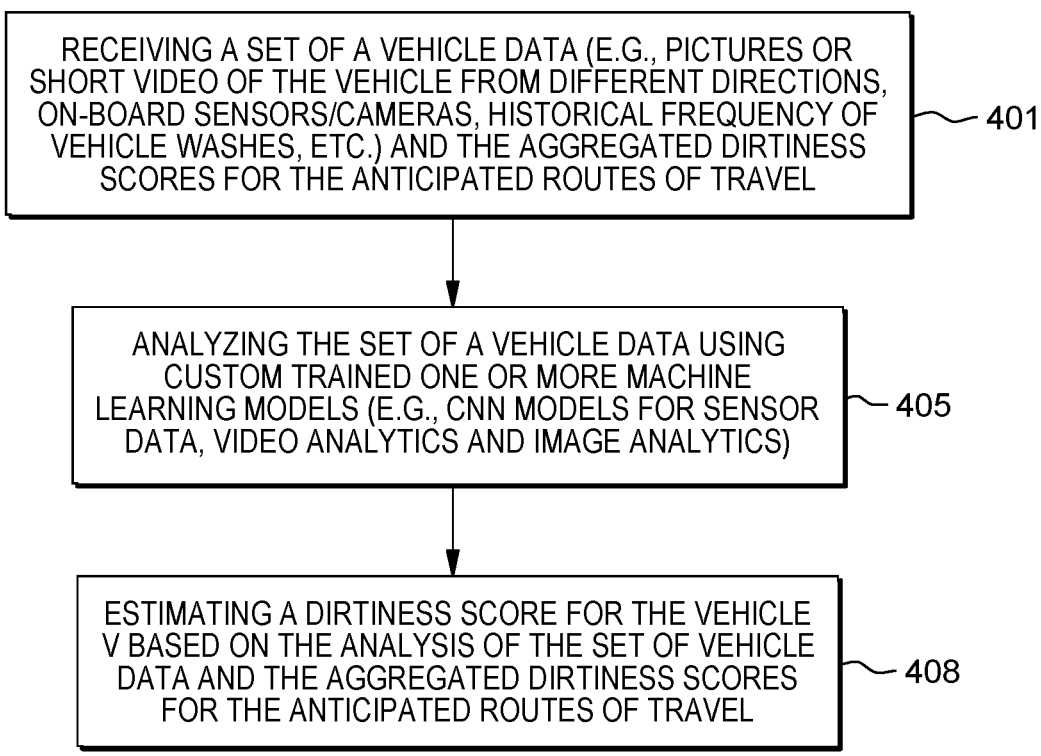
FIG. 4 depicts a method used to generate a vehicle dirtiness score by dirtiness scorer module in one embodiment.

FIG. 4 depicts a method 400 used to generate a vehicle dirtiness score by module 158. In an embodiment, a processor running on a computer system receives various input data for training the machine learned models to estimate a vehicle cleanness. In FIG. 4, at 401, the computer system receives a current vehicle input data set, e.g., both high and low quality (e.g., resolution quality) sensor-based images and/or video feeds from camera/sensors taken of the vehicle from different directions, e.g., from different on-board sensors/cameras. For example, self-driving vehicles, using their onboard cameras, can report on the cleanliness of similarly-connected vehicles as they pass by. In another embodiment, passengers in a privately owned car, taxi or limousine may self report the cleanliness of the car. Additionally received data can include the aggregated dirtiness scores $S_V$ 150 for the user's anticipated routes of travel and can include historical frequency of vehicle washes.

At 405, the system runs image analytics and video analytics techniques on this vehicle input data set using custom trained one or more machine learning models (e.g., CNN models for sensor data, video analytics and image analytics). The trained CNN models are run using the inputs including the current high and low quality sensor-based images and/or camera/video feeds inputs and current route dirtiness scores, to determine the current external (and/or internal) cleanliness of the vehicle. The determined external (and/or internal) cleanliness of the vehicle can be obtained by cross-referencing or comparing the value with a cohort of vehicles against "acceptable" standard cleanness levels. That is, in an embodiment, data from other vehicles are used to conduct a cohort analysis—e.g., a similarity analysis, to determine the external dirtiness level a car as compared to others (e.g., using a camera running CNN models to estimate dust volume/intensity/amount, mud, of on the car exterior/interior, etc.).

Finally, at 408, FIG. 4, module 158 computes the aggregated dirtiness scores for the anticipated routes of travel based on the image and video analysis conducted for the current vehicle input data set. At 408, the method 400 of calculating the aggregated dirtiness score $S_V$ uses the trained CNN models.

In computing the aggregated dirtiness scores at 408, the CNN models further include as input the current dirtiness level of the vehicle using one or more sensors installed on the vehicle or by user inspection. Alternatively, the method uses a visual analytics based mobile application configured with custom trained computer vision models (e.g., such as are running on a cloud system) enabling the user to take pictures (or short video) of the vehicle from different directions and upload them to a backend server/cloud system that performs routines to automatically analyze the pictures/video and generates an estimated dirtiness score for the vehicle V.

In another embodiment, for the case of self-driving vehicles, an application running on self-driving vehicles can control its on-board cameras to determine the level of cleanliness on itself or other cars that it passes by. Further, the self-driving cars can report in real-time the road conditions that can cause a car to become dirty (e.g., by impact of dirt/dust, road salt, snow, hail, slush, potholes, etc.) on the anticipated routes R.

Returning back to FIG. 2, at 215, the predictive car wash services system 151 of FIG. 1 selects and recommends one or more suitable wash locations L and associated time-of-day (ToD) for the vehicle to have a car wash. Finally, at 218, the system performs optimizing a user calendar and scheduling the car wash service based on the L and ToD.

Figure 5:
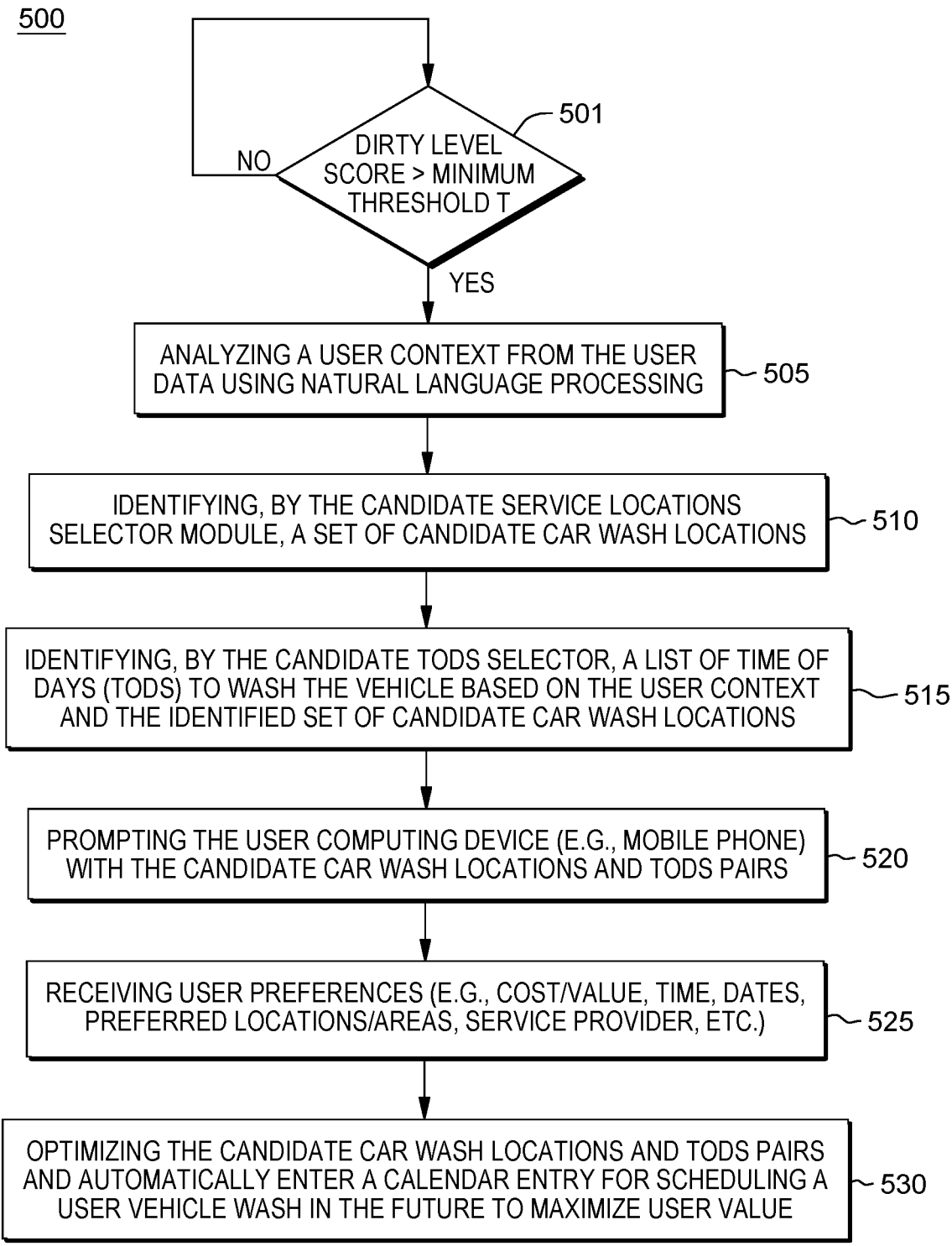
FIG. 5 illustrates a method run by the predictive car wash services system to optimally schedule a vehicle wash service for the vehicle given the anticipated routes and aggregated vehicle dirtiness scores according to an embodiment.

FIG. 5 depicts a method 500 run by the predictive car wash services system 151 to optimally schedule a vehicle wash service for the vehicle given the anticipated routes and aggregated vehicle dirtiness scores $S_V$. In an embodiment, the system 100 continuously or periodically monitors the user's context and vehicle dirtiness score and at 501, FIG. 5, makes a determination as to whether the computed aggregated dirty level score $S_V$ for vehicle V is above a minimum threshold value T of cleanliness/dirtiness, i.e., Dirty level Score>Minimum Threshold T In an embodiment, the threshold value T may be a value set according to a pre-determined cleanness standard as set by the user, vehicle owner or a cohort of users or by scanning recommended guidelines by manufacturers and/or car service providers using natural language processing techniques. For example, the user can initially specify the minimum threshold value T and over time the system learns to determine the T and adjust its value appropriately. A minimum threshold value T can correspond to a level of dirtiness warranting the system to automatically invoke methods to optimally schedule a vehicle car wash at a particular location and time once the aggregated vehicle dirtiness score exceeds T.

Thus, at 501, when the computed aggregated dirty level score $S_V$ for vehicle V is determined above a minimum threshold value T, then the system proceeds to step 505 to trigger application of modules for optimally scheduling a vehicle car wash for the user's vehicle.

At 505, FIG. 5, the method first runs steps to analyze a current user context from the user context input data, e.g., first set of user data 116 such as a user's calendar, e-mail application or historical data of user attended events. Such data may include the "unavoidable vehicle usage context" data regarding events that the vehicle will definitely attend or have a high probability of attending including anticipated routes the vehicle is most likely to traverse. In an embodiment, the method runs natural language processing techniques to decipher the user's first set of user data 116 to determine user context.

Continuing to 510, FIG. 5, the system 151 automatically invokes methods to identify a set of candidate car wash locations by invoking the Candidate Service Locations Selector module 160. When invoked, Candidate Service Locations <L>Selector module 160 conducts a search to obtain results suggesting a set of candidate car wash locations L in the area or vicinity of the vehicle's current location.

Continuing to 515, FIG. 5, the predictive car wash services system 151 further invokes candidate Time-of-Days (ToDs) selector module 170 that determines ToDs to form one or more list of candidate car wash locations L, e.g., a list of Time of Days (ToDs) to wash the vehicle based on the user context and the identified list of candidate car wash locations L. In an embodiment, the system 151 generates a list of candidate ToDs pairs <L, ToD>, where <T={<$L_1$, $ToD_1$>, <$L_2$,$ToD_2$> . . . , <$L_m$,$ToD_m$>} where m is the total number of candidate locations L and ToDs pairs.

Continuing to 520, FIG. 5, the predictive car wash services system 151 further invokes steps communicate the candidate car wash locations and ToDs pairs to the vehicle user's mobile phone or computing device to prompt the user (e.g., via a mobile phone) about the candidate car wash locations and ToDs pairs.

In an embodiment, the user's mobile phone or a vehicle-based processor is configured to execute instructions to produce a user interface, and output the user interface on a display of a user device (e.g., mobile app), populate and/or update the user interface at the user vehicle's dashboard or like interface such as a calendar interface with various visual indicators indicating candidate car wash locations and times.

Continuing to 525, FIG. 5, the predictive car wash services system 151 further receives user preferences (e.g., cost/value, time, dates, preferred locations/areas, service provider, etc.) for use by the service recommender and optimizer 180 to recommend a candidate car wash locations and ToDs pair(s) optimized for value.

Continuing to 530, FIG. 5, the service recommender and optimizer 180 runs methods for optimizing the candidate car wash locations and ToDs pairs and populate an entry in the user's calendar based on user preferences and anticipated routes. In embodiments, the optimizing the candidate car wash locations and ToDs pairs may take into account an anticipated weather context, e.g., in the context of days. An example output of the service recommender and optimizer 180 is a suggestion of the best days for a vehicle wash during the next 10 days.

In an embodiment, the Service Recommender and Optimizer module 180 runs further methods for recommending the best fit carwash services to optimized, e.g., to maximize, one or more values including, but not limited to: a cost/value, time, dates, preferred locations/areas, service provider, etc. In an embodiment, an objective function is configured and run so that it learns to optimize within a reinforcement learning framework. In an embodiment, the objective function measures the number of negative reviews provided by a driver, and attempts to minimize those over a set period, e.g., a 24 hour period. For example, if a driver presses a "Car is dirty!" indicator 20 times in a single day, and then 10 times in the following day, the reinforcement signal fed into the learning algorithm is 20-10=10, or the marginal increase in reward experienced over that period.

In one embodiment, the system 151 service recommender further automatically provides candidate time of day and location data pairs 185 to a calendar optimizer and service scheduler module 190 implemented to run methods for optimizing a calendar entry for a user based on route and weather and suggest the optimal days for a future time period, e.g., during the next ten days to schedule a vehicle wash that maximizes value. The Calendar Optimizer and Service Scheduler module optimizes the user calendar entries based on recommended car wash service locations. In an embodiment, the user can confirm/prioritize via the user's mobile application, the calendar entries based on the user's preference. For example, the system may place a car wash appointment in a free spot on a users schedule for the day, closest to the time that a maximum utility of the cleaning may be achieved (e.g., after 4 PM, the projected time when rain ceases). In another example, the system may recommend to the user to reorganize calendar entries (e.g., move "grocery shopping" entry marked "Monday August 19, at 4 PM" to "Tuesday, August 20 4:30 PM") according to the above one or more values. In another embodiment, the car wash appointment is made just prior to the user going on a date. If necessary, system 151 implemented at the computer system initiates an auto-scheduling of the car wash service at location L and at a time-of-day ToD, i.e., optimized so that the user/vehicle does not have to wait in line based on the current or historical waiting time at car wash locations, L.

That is, the anticipated routes of travel for the vehicle based on historical data, and pre-scheduled routine activities or events, is used to trigger the scheduling of car washing at a determined location and trigger the mobile car wash service.

In an embodiment, the user selects a suitable car wash location and ToD (i.e., <$L_i$,$ToD_i$>∈<L,ToD>, where <$L_i$, $ToD_i$>≠<$L_u$,$ToD_u$>).

In further embodiment, at the service station car wash, configuring the computer system associated with the car wash to communicate with and summon self-driving cars with monetary discounts during certain times, e.g., at times when the car wash is less crowded.

In further embodiment, computer system is configured in a "self-drying" mode wherein a self-driving car is programmed to take a route that is available to achieve a vehicle speed for optimal drying, with least spotting on the external surface of the vehicle or parking at a sunny location.

In another embodiment, the system may trigger both the vehicle and a mobile car wash service at a particular location for the vehicle to use that effectively minimizes fuel consumption and further dirt score as a result of traveling to/from the suggested location L and time-of-date $ToD_i$, e.g., using real-time analysis of data from satellite images and data and from crowdsourcing.

In another embodiment, when used in a real-time monitoring application, the service scheduler module 190 of system 100 determines and recommends and communicates a mitigating action to a driver or a self-driving vehicle, e.g., for purposes of informing the user of the vehicle or the SDV to avoid a route of the anticipated user routes currently determined to have exceedingly high dirtiness score (high dirtiness impact). The mitigating action communicated to the user or navigation controller of the SDV is to a change in route, to seek shelter in a garage, to park in a different outdoor location, and potentially assigning to the mitigating action a cost. For example, the system can calculate the cost of garaging the vehicle for an impending rainstorm vs. the cost of having the car washed.

As an example, when used in a real-time monitoring application, the system 100 runs methods to determine and communicate to the user an alternate route of travel to minimize factors which can make the vehicle dirty after the car is washed. For instance, the system chooses a route that avoids the vehicle driving on or near: construction sites (e.g., due to dust condition), dirt roads after a rain storm (due to mud condition), routes where snow plows recently sanded the roads (e.g., due to salt condition), congested roads during a snow storm (e.g., due to salt from cars in front being splashed on the car of interest).

In another embodiment, the optimizer and service scheduler module 190 performs calculating of the cost of garaging the vehicle for an impending rainstorm vs. the cost of having the car washed for communication to a user.

In these non-limiting embodiments, the system maximizes value, and therefore can base a recommendation to garage the vehicle to be based on: 1) the likelihood of a rainstorm of a certain duration, 2) the cleanliness of the car, 3) the cost of another car wash, and 4) the cost of garaging the car for the duration. Thus, knowing the route/road conditions in the anticipated direction of travel (e.g., whether there is mud/salt/sand along the route), the system can decide whether it's worth the investment to wash the vehicle. The optimizer module 190 runs methods for evaluating a current vehicle exterior state or score and compromise risk/cost versus a mitigating action cost and deploying an action based on the evaluation.

In an embodiment, the user and car wash service provider both may install and use on their devices the system (i.e., user application and provider application). In an embodiment, any communication between the two entities is mediated through the system 100 of FIG. 1 via a user approved push notification. In an embodiment, the user and/or service provider can configure on their respective apps for automatically mediating user requests, provider confirmation, etc.). For example, accordingly updating the user's calendar and provider client management system.

The present methods of the present disclosure are applicable for a self-driven (self-driving) vehicle (SDV) to autonomously decide when to head to car wash service based on various factors. For instance, a self-driving UBER® (registered trademark of Uber Technologies Inc.) will use the predictive car wash service in the embodiments where the customer(s) demands to be picked up by a clean car regardless of conditions that can make the vehicle dirty afterwards.

Figure 6:
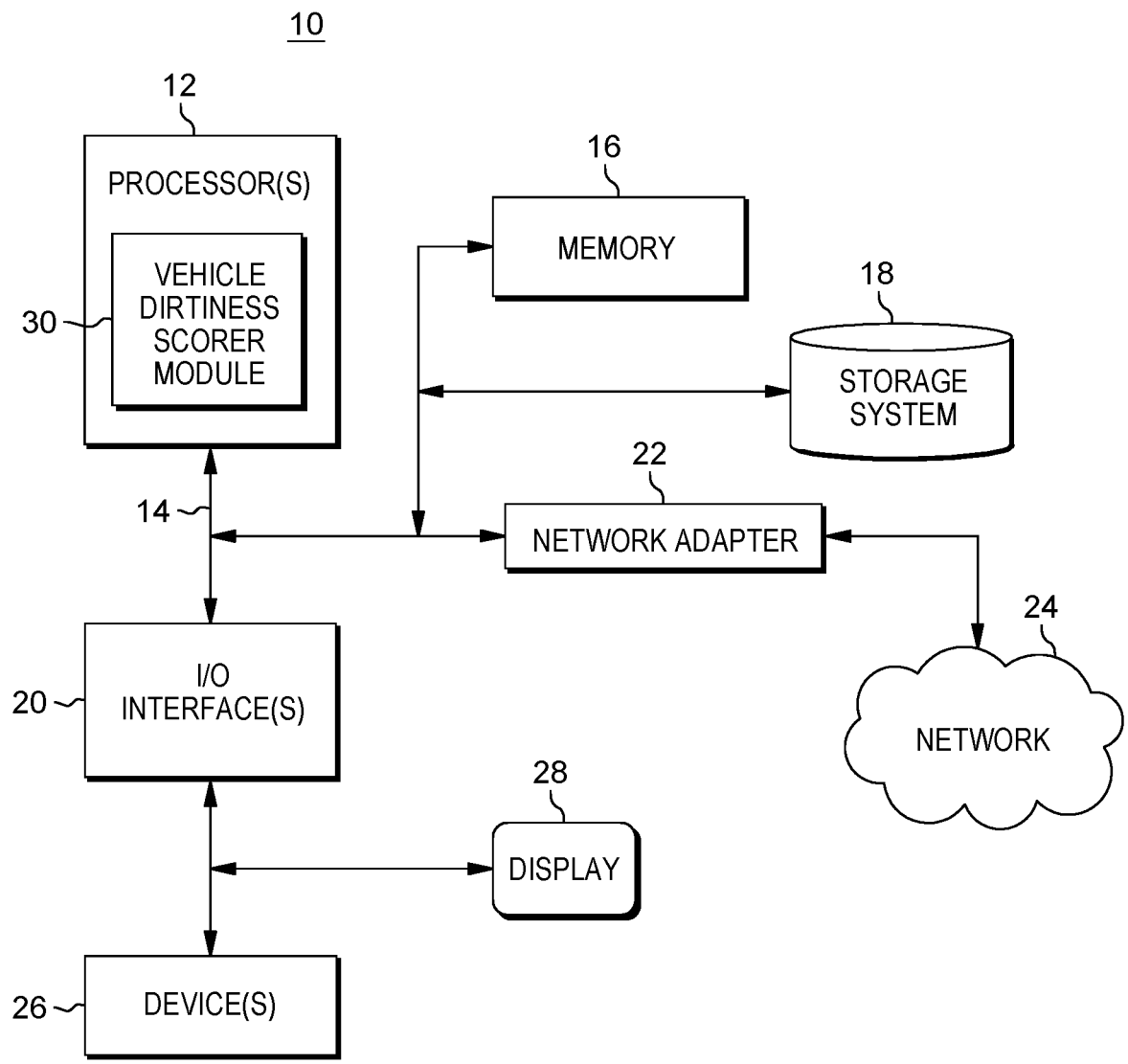
FIG. 6 illustrates a schematic of an example computer or processing system that may implement interactive visualization evaluation for classification models in one embodiment.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law. FIG. 6 illustrates a schematic of an example computer or processing system 10 that may implement analytics techniques and deep learning models for predictive vehicle wash services in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., Vehicle dirtiness scorer module 30) that performs the image and video analytics methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 7:
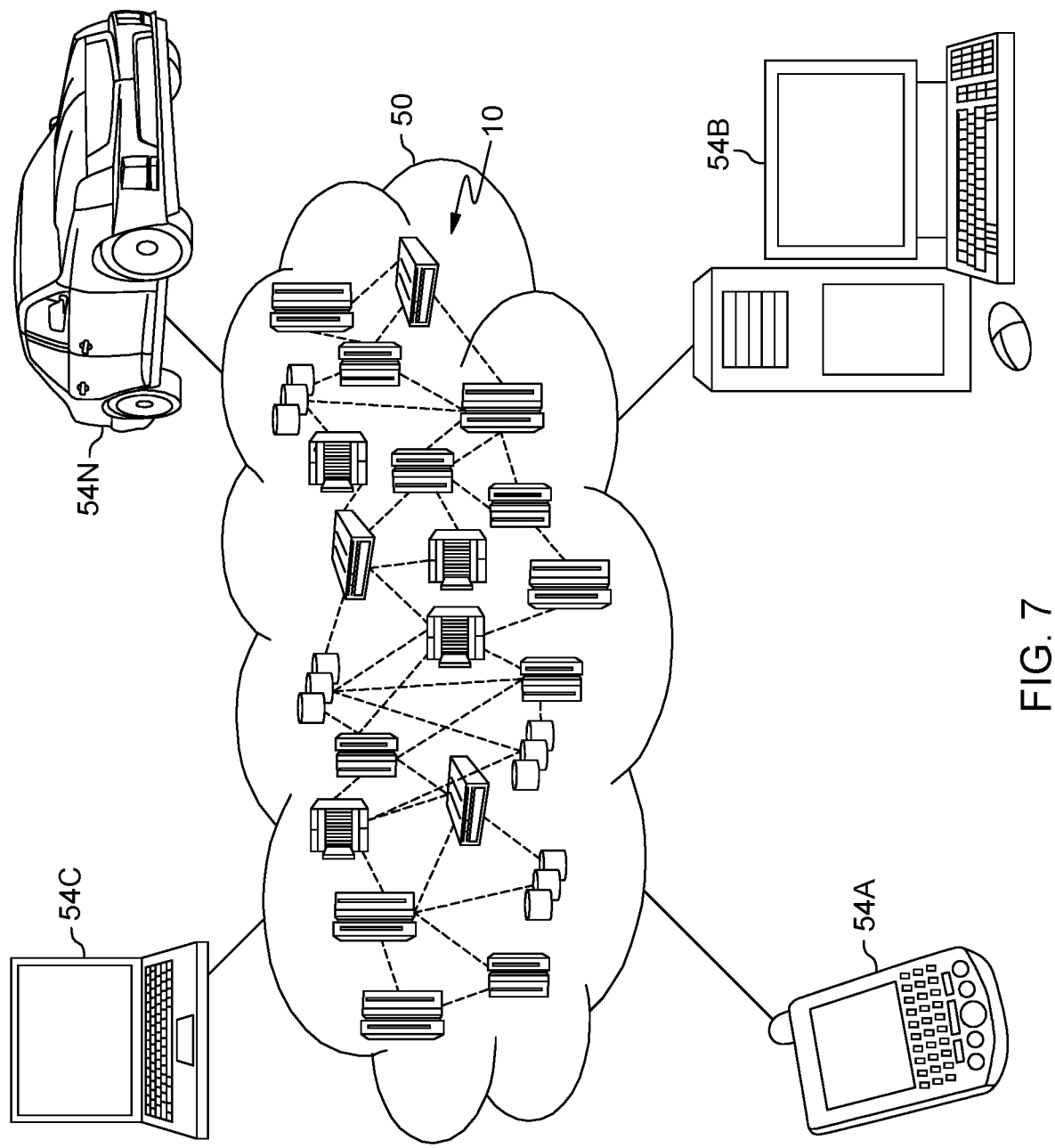
FIG. 7 depicts a cloud computing environment according to an embodiment.

FIG. 7 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 8:
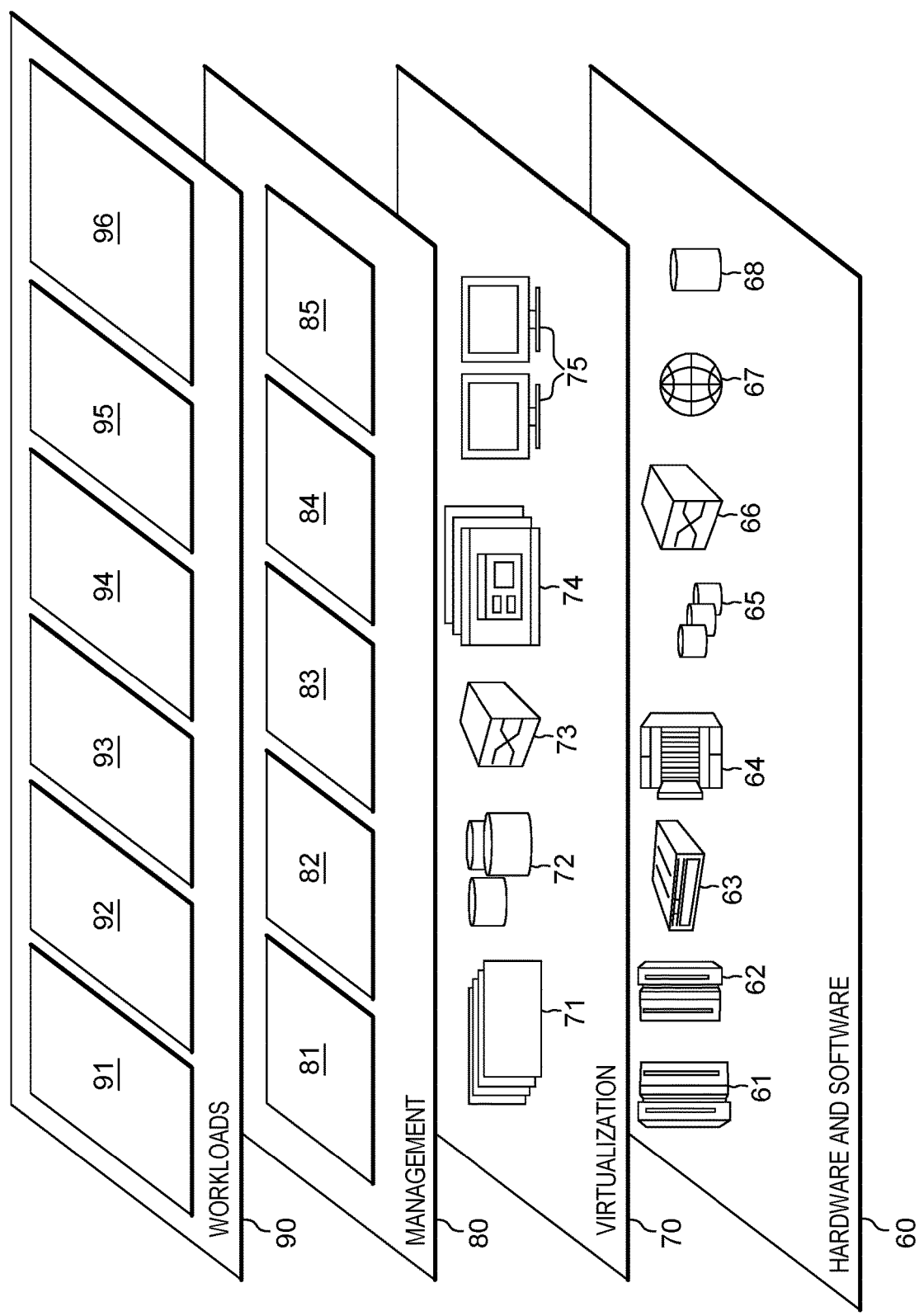
FIG. 8 depicts abstraction model layers according to an embodiment of the present disclosure.

FIG. 8 depicts abstraction model layers according to an embodiment of the present invention. Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a natural language/image analytics deep learning model processing block 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for automatically scheduling a wash service for a vehicle comprising:
    receiving, at a processor, data pertaining to a context associated with use of a vehicle;
    determining, by said processor, based on said user context, anticipated routes of travel for the vehicle to arrive at destination locations associated with said context;
    computing, by the processor, for each of the anticipated routes of travel, based on received first data, a measure of a road dirtiness condition impacting an exterior cleanliness condition of said vehicle;
    computing, at the processor, based on received second data, a measure of a current external dirtiness condition of said vehicle;
    determining, by said processor, based on said road dirtiness condition measure of each said anticipated routes and said current exterior cleanliness condition of said vehicle, one or more candidate vehicle washing locations configured to externally clean said user vehicle and available times of day in a future time period with which said vehicle can be externally cleaned at a vehicle washing location; and
    automatically scheduling, using said processor, a candidate car wash location of said one or more candidate car wash locations and an associated time optimally determined to clean said external vehicle in anticipation of traveling along said one or more of said anticipated routes of travel to one or more destination locations.

2. The computer-implemented method of claim 1, wherein said received first data comprises road conditions information and/or forecast weather conditions predicted for each of the anticipated routes of travel, a current user context, a traffic forecast information, current and historical data received from other vehicles that have traversed the anticipated routes of travel and crowdsourced data.

3. The computer-implemented method of claim 2, wherein said computing a road dirtiness condition measure for each of the anticipated routes of travel for the vehicle comprises:
    analyzing, using said processor, said road or forecast weather conditions and current and historical data received from other vehicles for each of the anticipated routes of travel of said vehicle;
    running, using said processor, a machine learned model trained to predict, based on said analysis, one or more conditions for each of the roads of each of the anticipated routes of travel, said machine learned model generating a route dirtiness score based on analysis of the determined one or more conditions, said route dirtiness score characterizing an impact of an external cleanliness of said vehicle.

4. The computer-implemented method of claim 3, wherein said trained predicting model is a convocation/recurrent neural network models implementing a sliding window with multi-step forecasting.

5. The computer-implemented method of claim 2, receiving, from a user's calendar application, historical data pertaining to the context associated with use of the vehicle and data comprising pre-scheduled routine and non-routine activities or events requiring usage of the vehicle at a predetermined level of exterior cleanliness, said determining anticipated routes of said vehicle usage comprising:
  analyzing, by the processor, using natural language processing, the historical data from the user's calendar application to determine one or more routine or non-routine activities or events and historical activities or events;
  identifying whether an activity or event is unavoidable for the user to use the vehicle based on the analyzing; and
  determining, by the processor, said anticipated routes based on said identified unavoidable activities or events requiring use of said vehicle.

6. The computer-implemented method of claim 3, wherein said one or more road conditions of the roads of each of the anticipated routes of travel comprises:
  road conditions selected from the group comprising: an amount, volume or intensity of dust, dirt, mud, snow, hail, slush, sand or salt.

7. The computer-implemented method of claim 1, wherein said received second data comprises: one or more camera pictures, video feeds from on-board or externally located sensor devices located on the vehicle, video feeds from other connected vehicles, data from sensor devices from the other connected vehicles, said computing a measure of the dirtiness of the vehicle exterior comprising:
  analyzing, using said processor, said second data, for determining a current exterior cleanliness of said vehicle;
  running, using said processor, a further machine learned model trained to compute, based on said current exterior vehicle cleanliness analysis and based on the route dirtiness score, a current vehicle exterior dirtiness score; and
  determining, by said processor, a need for cleaning the exterior vehicle using said current vehicle dirtiness score.

8. The computer-implemented method of claim 7, wherein said determining a need for cleaning the exterior vehicle comprises:
  comparing, by the processor, said current vehicle exterior dirtiness score against a pre-determined threshold;
  triggering, by said processor, responsive to said current vehicle exterior dirtiness score exceeding said pre-determined threshold, an identifying of candidate car wash service locations configured to externally clean said user vehicle and available times of day in a future time period;
  configuring, using the processor, an optimization problem for determining an optimal candidate car wash service location configured to externally clean said user vehicle and available times of day that maximizes a user value; and
  solving, using said processor, said optimization problem to determine an optimal candidate car wash service location and available times of day.

9. The computer-implemented method of claim 1, wherein said vehicle is user operated or a self-driving vehicle, said method further comprising:
  determining, by the processor, an action for a vehicle to take to mitigate any impact to external vehicle cleanliness, said mitigating action having an associated cost assigned; and
  communicating, by said processor, said message indicating said mitigating action and cost to a vehicle driver or a self-driving vehicle operator.

10. The computer-implemented method of claim 9, wherein the mitigating action comprises recommending, by the processor, one or more changes comprising: a change to traverse an alternate route of travel to keep car clean, after it is washed, a change to seek shelter of said vehicle in a closed garage, a change to park the vehicle in a different outdoor location.

11. A system comprising:
  a memory device configured to store data;
  a hardware processor configured to be in communication with the memory device, the hardware processor being configured to:
  receive from the memory device, data pertaining to a context associated with use of a vehicle;
  determine, based on said user context, anticipated routes of travel for the vehicle to arrive at destination locations associated with said context;
  compute, for each of the anticipated routes of travel, based on received first data, a measure of a road dirtiness condition impacting an exterior cleanliness condition of said vehicle;
  compute, based on received second data, a measure of a current external dirtiness condition of said vehicle;
  determine, based on said road dirtiness condition measure of each said anticipated routes and said current exterior cleanliness condition of said vehicle, one or more candidate vehicle washing locations configured to externally clean said user vehicle and available times of day in a future time period with which said vehicle can be externally cleaned at a vehicle washing location; and
  automatically schedule a candidate car wash location of said one or more candidate car wash locations and an associated time optimally determined to clean said external vehicle in anticipation of traveling along said one or more of said anticipated routes of travel to one or more destination locations.

12. The system of claim 11, wherein said received first data comprises road conditions information and/or forecast weather conditions predicted for each of the anticipated routes of travel, a current user context, a current and historical data received from other vehicles that have traversed the anticipated routes of travel, wherein to compute a road dirtiness condition measure for each of the anticipated routes of travel, said processor is further configured to:
  analyze said road or forecast weather conditions and current and historical data received from other vehicles for each of the anticipated routes of travel of said vehicle; and
  run a machine learned model trained to predict, based on said analysis, one or more conditions for each of the roads of each of the anticipated routes of travel, said machine learned model generating a route dirtiness score based on analysis of the determined one or more conditions, said route dirtiness score characterizing an impact of an external cleanliness of said vehicle.

13. The system of claim 12, wherein said processor is further configured to:
  receive, from a user's calendar application, historical data pertaining to the context associated with use of the vehicle and data comprising pre-scheduled routine and non-routine activities or events requiring usage of the vehicle at a predetermined level of exterior cleanliness, wherein to determine anticipated routes of said vehicle usage, said processor is further configured to:
  analyze, using natural language processing, the historical data from the user's calendar application to determine one or more routine or non-routine activities or events and historical activities or events;

identify whether an activity or event is unavoidable for the user to use the vehicle based on the analyzing; and determine said anticipated routes based on said identified unavoidable activities or events requiring use of said vehicle.

14. The system of claim 11, wherein said second data comprises: one or more camera pictures, video feeds from on-board or externally located sensor devices located on the vehicle, video feeds from other connected vehicles, data from sensor devices from the other connected vehicles, wherein to compute a measure of the dirtiness of the vehicle exterior, said processor is further configured to:

analyze said second data to determine a current exterior cleanliness of said vehicle;

run a further machine learned model trained to compute, based on said current exterior vehicle cleanliness analysis and based on the route dirtiness score, a current vehicle exterior dirtiness score; and determine a need for cleaning the exterior vehicle using said current vehicle dirtiness score.

15. The system of claim 14, wherein to determine a need for cleaning the exterior vehicle, said processor is further configured to:

compare said current vehicle exterior dirtiness score against a pre-determined threshold;

trigger, responsive to said current vehicle exterior dirtiness score exceeding said pre-determined threshold, an identifying of candidate car wash service locations configured to externally clean said user vehicle and available times of day in a future time period;

configure an optimization problem for determining an optimal candidate car wash service location configured to externally clean said user vehicle and available times of day that maximizes a user value; and solve said optimization problem to determine an optimal candidate car wash service location and available times of day.

16. A computer program product comprising a non-transitory computer readable storage medium having program instructions embodied therewith, the program instructions executable by a processing element of a device to cause the device to:

receive from a memory device, data pertaining to a context associated with use of a vehicle;

determine, based on said user context, anticipated routes of travel for the vehicle to arrive at destination locations associated with said context;

compute, for each of the anticipated routes of travel, based on received first data, a measure of a road dirtiness condition impacting an exterior cleanliness condition of said vehicle;

compute, based on received second data, a measure of a current external dirtiness condition of said vehicle;

determine, based on said road dirtiness condition measure of each said anticipated routes and said current exterior cleanliness condition of said vehicle, one or more candidate vehicle washing locations configured to externally clean said user vehicle and available times of day in a future time period with which said vehicle can be externally cleaned at a vehicle washing location; and automatically schedule a candidate car wash location of said one or more candidate car wash locations and an associated time optimally determined to clean said external vehicle in anticipation of traveling along said one or more of said anticipated routes of travel to one or more destination locations.

17. The computer program product of claim 16, wherein said received first data comprises road conditions information and/or forecast weather conditions predicted for each of the anticipated routes of travel, a current user context, a current and historical data received from other vehicles that have traversed the anticipated routes of travel, wherein to compute a road dirtiness condition measure for each of the anticipated routes of travel, said processing element further causes the device to:

analyze said road or forecast weather conditions and current and historical data received from other vehicles for each of the anticipated routes of travel of said vehicle; and run a machine learned model trained to predict, based on said analysis, one or more conditions for each of the roads of each of the anticipated routes of travel, said machine learned model generating a route dirtiness score based on analysis of the determined one or more conditions, said route dirtiness score characterizing an impact of an external cleanliness of said vehicle.

18. The computer program product of claim 17, wherein said processing element further causes the device to:

receive, from a user's calendar application, historical data pertaining to the context associated with use of the vehicle and data comprising pre-scheduled routine and non-routine activities or events requiring usage of the vehicle at a predetermined level of exterior cleanliness, wherein to determine anticipated routes of said vehicle usage, said processing element further causes the device to:

analyze, using natural language processing, the historical data from the user's calendar application to determine one or more routine or non-routine activities or events and historical activities or events;

identify whether an activity or event is unavoidable for the user to use the vehicle based on the analyzing; and determine said anticipated routes based on said identified unavoidable activities or events requiring use of said vehicle.

19. The computer program product of claim 16, wherein said second data comprises: one or more camera pictures, video feeds from on-board or externally located sensor devices located on the vehicle, video feeds from other connected vehicles, data from sensor devices from the other connected vehicles, wherein to compute a measure of the dirtiness of the vehicle exterior, said processing element further causes the device to:

analyze said second data to determine a current exterior cleanliness of said vehicle;

run a further machine learned model trained to compute, based on said current exterior vehicle cleanliness analysis and based on the route dirtiness score, a current vehicle exterior dirtiness score; and determine a need for cleaning the exterior vehicle using said current vehicle dirtiness score.

20. The computer program product of claim 19, wherein to determine a need for cleaning the exterior vehicle, said processing element further causes the device to:

compare said current vehicle exterior dirtiness score against a pre-determined threshold;

trigger, responsive to said current vehicle exterior dirtiness score exceeding said pre-determined threshold, an identifying of candidate car wash service locations configured to externally clean said user vehicle and available times of day in a future time period;

configure an optimization problem for determining an optimal candidate car wash service location configured to externally clean said user vehicle and available times of day that maximizes a user value; and solve said optimization problem to determine an optimal candidate car wash service location and available times of day.

* * * * *